UNITED STATES PATENT OFFICE.

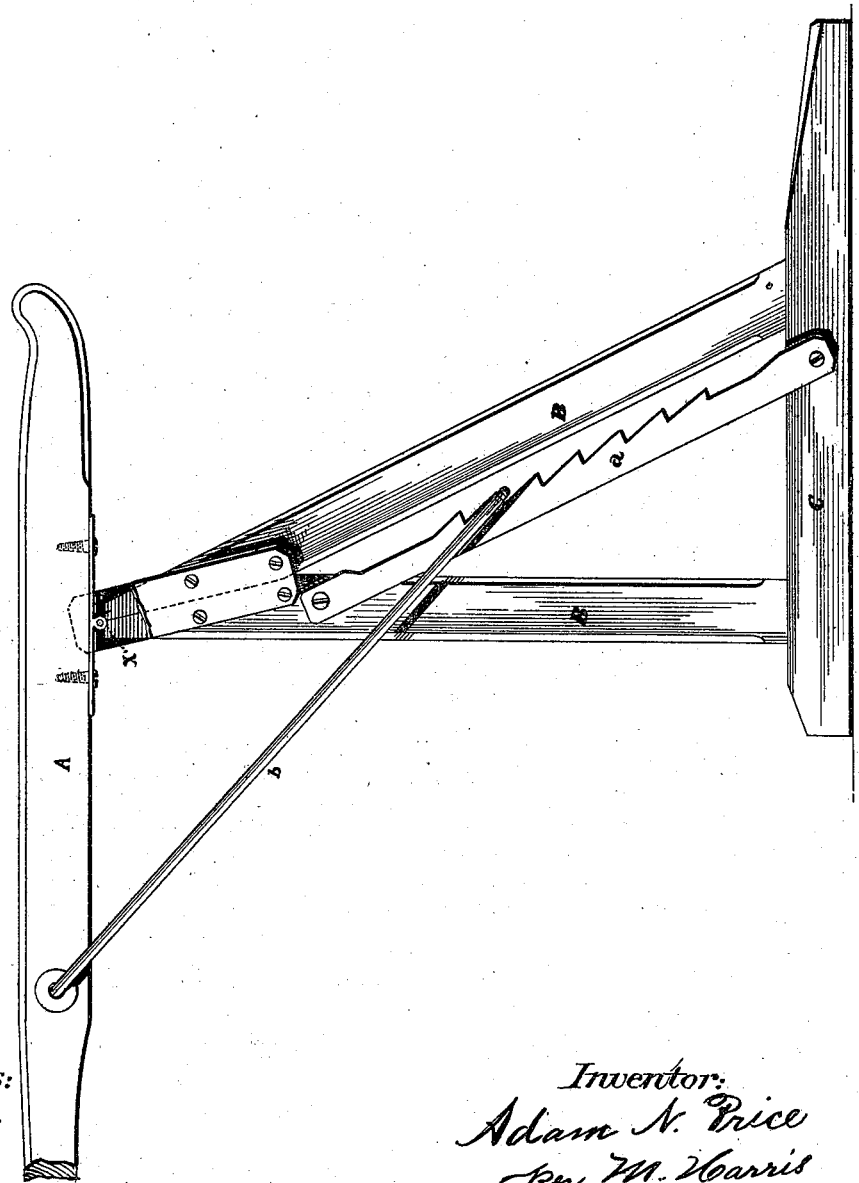

ADAM N. PRICE, OF JAMESTOWN, NEW YORK.

IMPROVEMENT IN LIFTING-JACKS.

Specification forming part of Letters Patent No. 173,338, dated February 8, 1876; application filed January 3, 1876.

*To all whom it may concern:*

Be it known that I, ADAM N. PRICE, of Jamestown, in the county of Chautauqua and State of New York, have invented certain new and useful Improvements in Lifting-Jacks; and I do hereby declare that the following is a full, clear, and exact description thereof, which will enable others skilled in the art to which it appertains to make and use the same, reference being had to the accompanying drawings, and to the letters of reference marked thereon, which form a part of this specification.

My invention relates to that class of lifting-jacks more especially adapted for raising wagons, carriages, &c., and has for its object the providing a cheap and simple mechanism, and one that may be used successfully by one person.

That others may fully understand my invention, I will more fully describe it, having reference to the following drawings, wherein—

Figure 1 is a side view of my invention with one end of the lever broken off. Fig. 2 is a transverse section.

The horizontal bed-piece C is of wood, and of sufficient size and length to be strong, and into this is securely fastened one end of the upright standards B B, at some distance apart, and at such an angle that they come together at the top, across which the lever A is hinged at X, as shown in Fig. 1, forming a fulcrum. This fulcrum may be stationary, as shown, or may be made to rise and fall by lengthening the iron straps on the sides of the standards B B, having holes at intervals, so that a movable pin can be put through them and the lever A.

A ratchet-bar, $a$, is made of suitable material, and securely fastened at its upper end to upright standard B near its top, having its lower end fastened to the bed-piece C.

A rod, $b$, is bent at one end, and passes through the long arm of the lever A at a suitable distance from the fulcrum X, and passes down and around the ratchet-bar $a$.

The lifting-jack thus described operates as follows: The short end of lever A is placed under the wagon or weight to be raised, and power being applied downward on the long end of the lever, the rod $b$ passes down on the ratchet-bar $a$, and by removing the power the rod catches into the ratchet and holds it at any desired point.

By cutting notches on the front standard B and letting the pawl-rod $b$ pass around that instead of the ratchet-bar, as shown, the same result would be obtained without using the ratchet-bar $a$; yet I prefer to make it as shown in drawing.

Having described my invention, what I claim as new, and desire to secure by Letters Patent, is—

In lifting-jacks, the pawl-rod $b$, when made at its lower end to encircle the ratchet-bar $a$, in combination with lever A, standards B B, bed-piece C, and ratchet-bar $a$, all constructed and used in the manner and for the purpose set forth.

In testimony that I claim the foregoing as my own invention, I affix my signature in presence of two witnesses.

ADAM N. PRICE.

Witnesses:
MILO HARRIS,
M. E. VAN WERT.